United States Patent [19]

Taga

[11] Patent Number: 4,953,045
[45] Date of Patent: Aug. 28, 1990

[54] CASSETTE TAPE PLAYER WITH DOOR OPERATING MECHANISM

[75] Inventor: Haruo Taga, Iwaki, Japan

[73] Assignee: Alpine Electronics Inc., Tokyo, Japan

[21] Appl. No.: 239,102

[22] Filed: Aug. 31, 1988

[30] Foreign Application Priority Data

Dec. 25, 1987 [JP] Japan ............................ 62-196776[U]

[51] Int. Cl.$^5$ .............................................. G11B 15/00
[52] U.S. Cl. .................................... 360/96.5; 242/200
[58] Field of Search ............................ 360/96.5, 99.06; 242/197–201

[56] References Cited

U.S. PATENT DOCUMENTS 4,424,540  1/1984  Naoi .
4,866,552  9/1989  Nagase ................................ 360/96.5

Primary Examiner—A. J. Heinz
Attorney, Agent, or Firm—Guy W. Shoup; Norman R. Klivans

[57] ABSTRACT

An improved door opening/closing device for cassette tape player is disclosed in which an abutting member and a door opening/closing member composed of an arm portion and a pivoting portion are provided in order to interlock the door opening/closing with the movement of a cassette movement holder. This makes it possible to omit the use of an additional separate gear, thereby making it possible to skip the time-consuming work for assembling of the additional gear.

4 Claims, 7 Drawing Sheets

4,953,045

CASSETTE TAPE PLAYER WITH DOOR OPERATING MECHANISM

FIELD OF THE INVENTION

The present invention relates to a cassette tape player (player/recorder), particularly to a door opening/closing device installed on the front side thereof.

BACKGROUND OF THE INVENTION

The conventional cassette tape players are constituted such that an assembly of a motor and a number of gears are used in order to move the tape cassette, and said gears and another gear installed for opening/closing the door are meshed together, resulting in that the opening/closing of the door and the moving of the tape cassette are interlocked with each other.

But in order to interlock the opening/closing of the door and the moving of the tape cassette, a separate gear has to be installed, and this gear has to be meshed with other gears as mentioned above. In order to achieve such a constitution, the shape of the new gear has to be sufficiently considered, and the coupling manner between the said new gear and the other gears for moving the tape cassette has to be strictly studied. This makes the designing work more difficult, and further, the complication of the designing work is accompanied by consumption of much time.

SUMMARY OF THE INVENTION

Therefore, it is the object of the present invention to provide a cassette tape player door opening/closing device which is easy and simple to assemble, and overcomes all the disadvantages of the prior art devices.

In order to achieve the above object, the present invention provides the following constitution. That is, a door opening/closing lever is provided which consists of an arm section and a pivot section. The arm section is connected to the door, and carries out the opening/closing of the door, while the pivot section supports and moves said arm section when it is pushed by an abutting member of the cassette moving section. That is, an abutting member which is interlocked to the cassette moving section pushes the pivot section, so that the arm section could be pivoted in order to open/close the door.

The device of the present invention thus constituted works as follows. When the tape cassette is moved by the cassette moving section, the abutting member of the cassette moving section pushes, so that the door connected to the lever could be opened or closed.

BRIEF DESCRIPTION OF THE DRAWINGS

The object and advantages of the present invention will become more apparent by describing the preferred embodiment of the present invention with reference to the attached drawings in which.

DESCRIPTION OF THE PREFERRED EMBODIMENT

Figure 1:
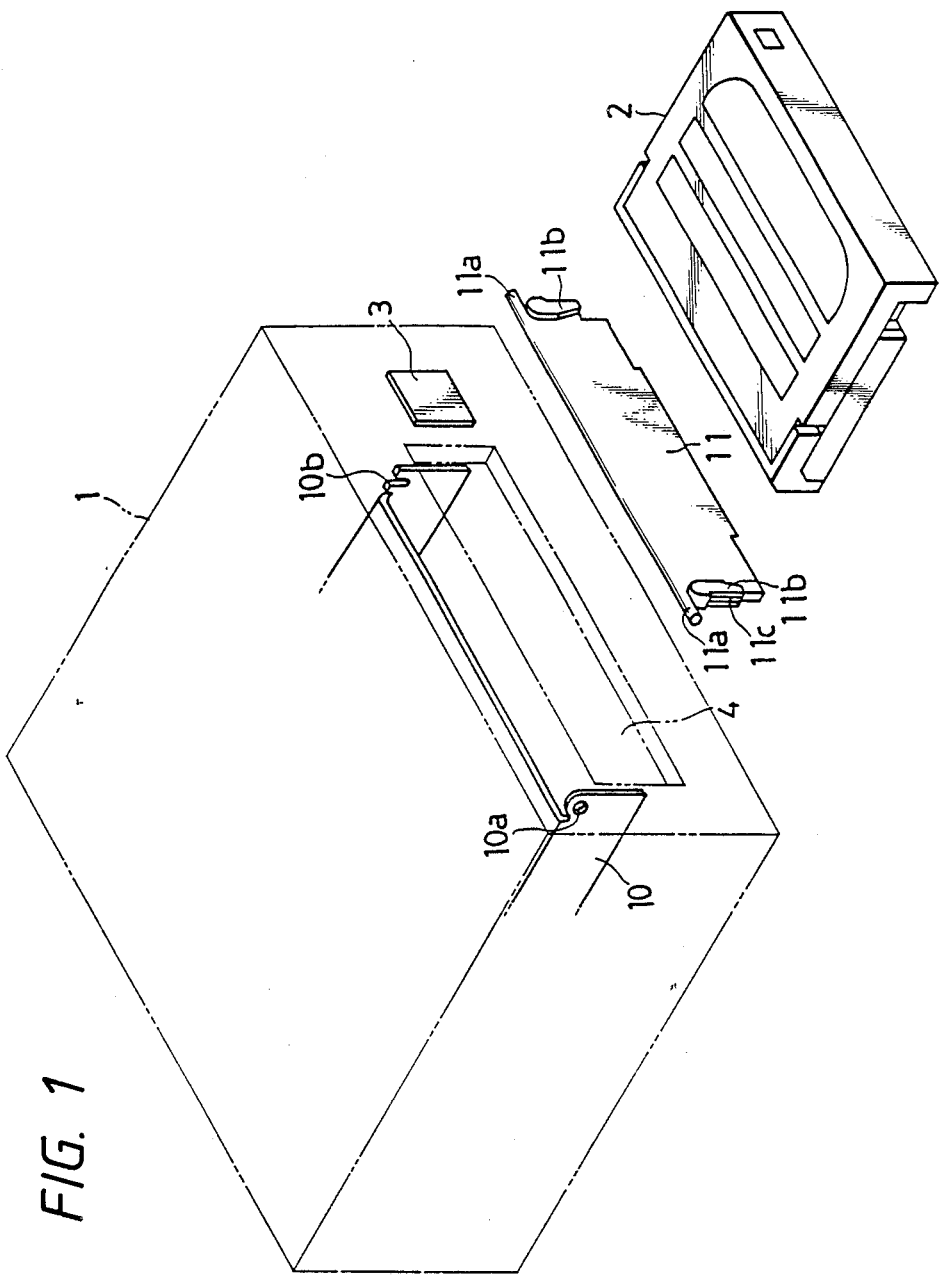
FIG. 1 is a perspective view of the rotary type digital audio tape player (R-DAT) according to the present invention.
Figure 2:
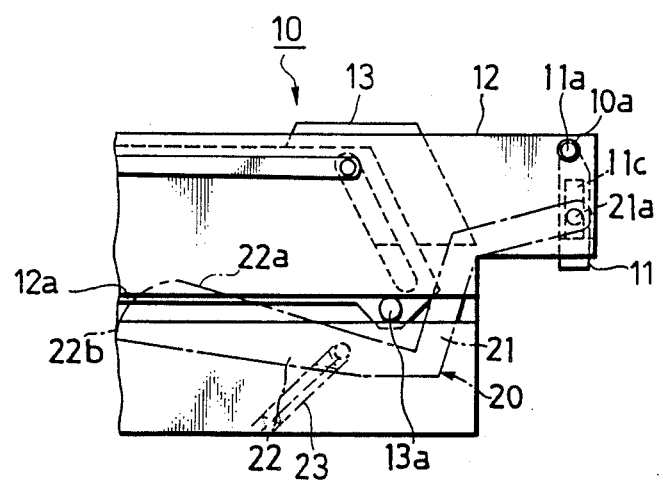
FIG. 2 is a side view of the cassette moving section which is installed within the R-DAT.

FIG. 1 is a perspective view of the rotary type digital audio type player (to be referred to as "R-DAT" hereinafter).

Reference No. 1 is a tape player case within which a cassette moving mechanism 10 is installed for moving a tape cassette 2 up to a predetermined position, and at the front face of which an eject button 3 and an opening 4 are provided. The opening 4 is of the size enough to receive the tape cassette 2, and is located at a place where it is couplable with a hanging door 11. The door 11 is integrally provided with supporting shafts 11a, 11a which are respectively inserted into a door attachment hole 10a and a door attachment slot 10b which are in turn provided at the respective upper side edges of the cassette moving mechanism 10. Below the said supporting shafts 11a, protrusions 11b, 11b for determining the position of the tape cassette 2 are provided. At the side of one of the protrusions 11b which is to be adjacently located to the door attachment hole 10a, a groove 11c is provided which is to be engaged with a pin 21a provided on an arm 21. When the door 11 is opened or closed by means of a door opening/closing lever 20, said pin 21a slides along the groove 11c.

Now the door opening/closing lever 20 will be described in detail referring to FIGS. 2 to 7.

First, the cassette moving mechanism 10 in which the door opening/closing lever 20 is attached will be described. The cassette moving mechanism 10 is composed of side chassis 12 and a cassette movement holder 13, the former being attached to the opposite sides of a chassis (not shown) which has a capstan or a rotary head, and the latter being for moving the tape cassette 2 up to a predetermined position above the chassis. The cassette movement holder 13 is provided with a pin 13a which is coupled with a long narrow hole 12a formed in the side chassis 12, so that, when the tape cassette 2 is moved, the pin 13a moves through the long narrow hole 12a, and pushes the door opening/closing lever 20 which is slidably attached to the side chassis 12.

The door opening/closing lever 20 is provided with a pin 21a which is engaged with the door 11 which is in turn hung on the side chassis 12. The door opening/closing lever 20 is composed of an arm 21 having a ⌈-shape, and a pivoting lever 22 having a linear section 22a and a curved section 22b for pivoting the arm 21. The lever 22 is provided with a spring, and, due to the resilient force of the spring, the linear section 22a of the pivoting lever 22 forms an angle θ relative to the longitudinal direction of the long narrow hole 12a which is formed in the side chassis 12. When the pivoting lever 22 is in a slope by an angle θ, the door 11 is in the closed position. When the cassette moving mechanism thus constituted moves the tape cassette 2, it moves the door opening/closing lever 20 properly in order to open or close the door 11 as described below.

Figure 3:
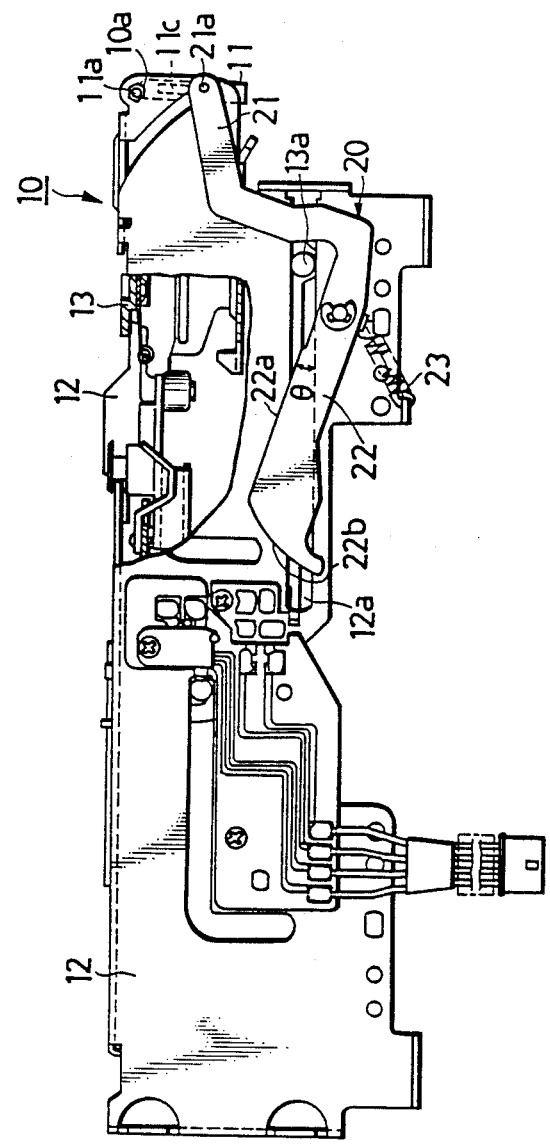
FIGS. 3 to 7 are partially sectional views of the cassette moving mechanism of the R-DAT.

As shown in FIG. 3, when the tape cassette 2 is not contained in the cassette moving mechanism 10, a force inhibiting the inclining of the door opening/closing lever 20 is not being applied, and therefore, the door opening/closing lever 20 is inclined, thereby keeping the door 11 in a closed state.

Figure 4:
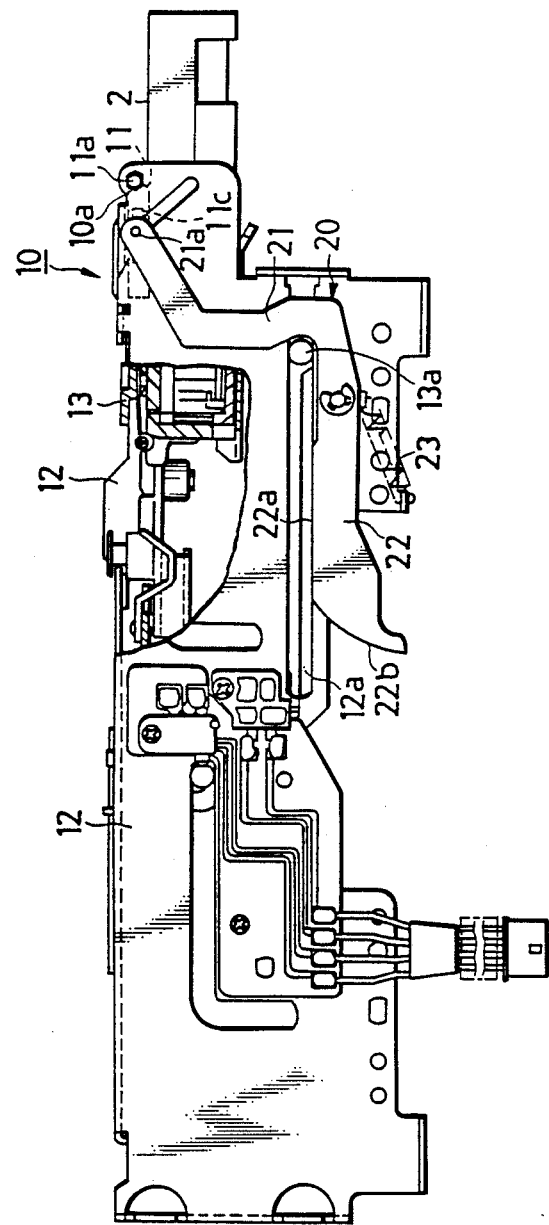
Figure 5:
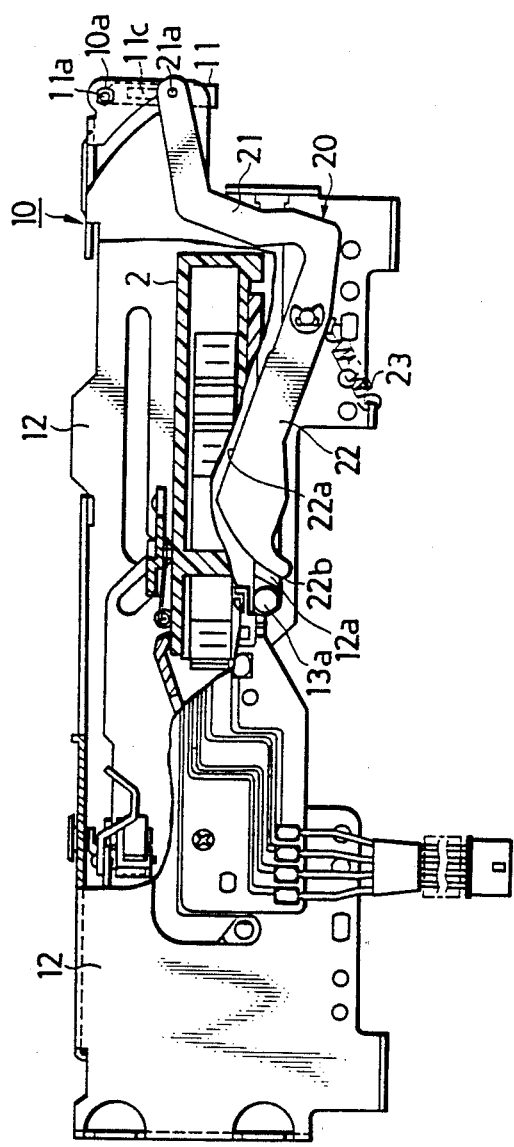
Figure 6:
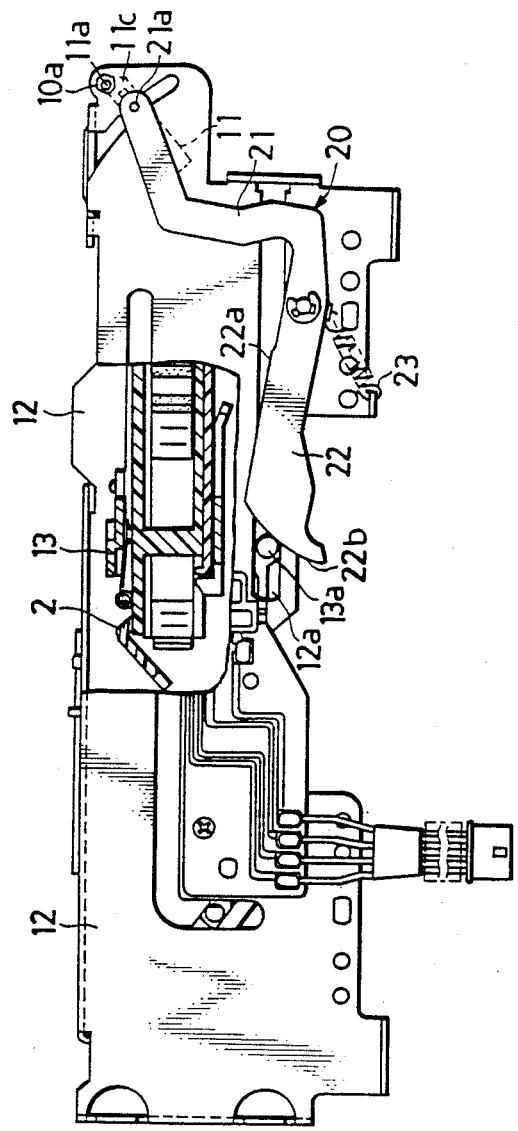

On the contrary, as shown in FIG. 4, if the tape cassette 2 is inserted into the cassette moving mechanism 10, the door 11 is pushed upward by the action of the tape cassette 2, and the door opening/closing lever 20 is pivoted so that the linear section 22a of the pivoting lever 22 should become parallel to the longitudinal direction of the long narrow hole 12a. If the tape cassette 2 is further pushed into the cassette moving mechanism 10, the cassette movement holder begins auto loading operation, and the pin 13a of the cassette movement holder 13 moves slidably along the linear section 22a of the pivoting lever 22. Meantime, as the pin 13a keeps the pivoting lever 22 from being inclined, a parallel relation is maintained between the linear section 22a and the longitudinal direction of the long narrow hole 12a, thereby keeping the door in an open state. Again, if the pin 13a is proceeded inwardly, and the pin 13a reaches the curved section 22b of the pivoting lever 22, the force of the pin 13a is slowly released from supporting against the inclining of the linear section 22a of the pivoting lever 22. When the pin 13a reaches the end of the curved section 22b of the pivoting lever 22, the door 11 is closed as when the tape cassette 2 is not inserted at all, as shown in FIG. 5.

Figure 7:
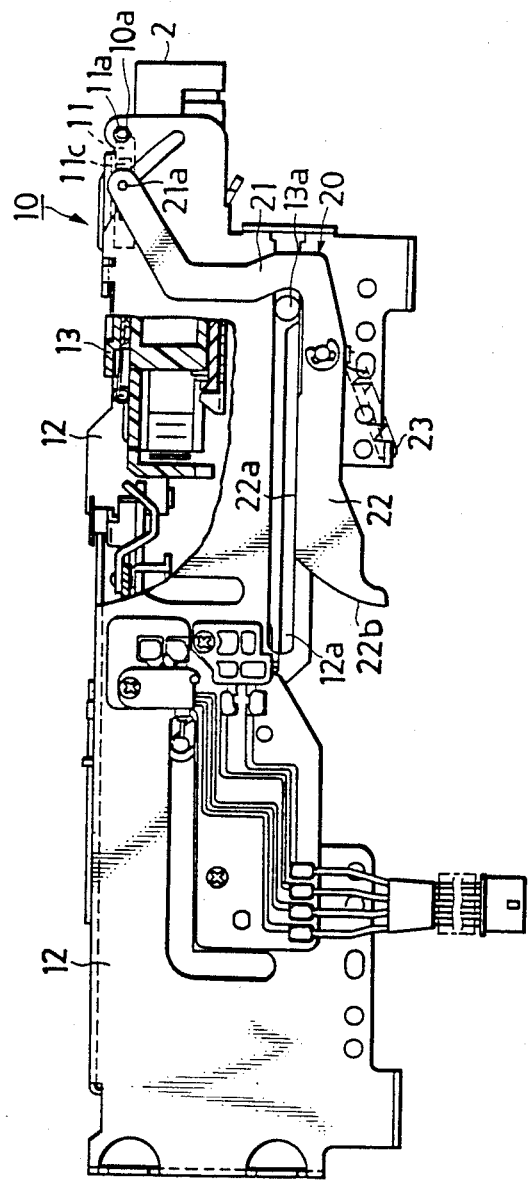

Meanwhile, when the tape cassette 2 is being ejected from the cassette moving mechanism 10, the pin 13a pushes the curved section 22b to push down the pivoting lever 22, thereby making the linear section 22a parallel with the longitudinal direction of the long narrow hole 12a. At the same time, the arm 21 is pivoted in a direction of opening the door 11, so that the pin 13a should move slidably along the linear section 22a of the pivoting lever 22 in order to bring the door 11 to an open position. In this open position, as shown in FIG. 7, the tape cassette 2 can be taken out.

According to the embodiment of the present invention as described above, a pin which is interlocked to the movement of the cassette movement holder pushes the door opening/closing lever in order to pivot the arm of the lever, thereby opening or closing the door. Thus the door is opened or closed in an interlocked state with the movement of the cassette movement holder, and therefore, an additional gear is not needed. This makes it possible to omit the time-consuming gear assembling work, thereby making it possible to improve the assembling productivity.

What is claimed is:

1. A cassette tape player, comprising:
   a case defining an opening for inserting a tape cassette;
   a door for closing said opening, the door having a groove formed in an edge thereof and being pivoted in a direction for opening the door by insertion of a tape cassette in the opening;
   a cassette moving section for moving an inserted tape cassette to a predetermined position inside said opening, and including an abutting member movable with said cassette moving section;
   a lever for opening and closing said door, including an arm portion having a pin engaged with said groove, and a pivoting portion for supporting said arm portion and for pivoting upon the arm portion; and
   wherein said abutting member moves in a straight line in a direction for inserting and ejecting a tape cassette, said abutting member engages said pivoting portion so that said pivoting portion prevents the straight line movement only when said door is closing; and
   wherein when a tape cassette is ejected from the predetermined position, said pivoting portion is pushed by said abutting member and said arm portion is simultaneously pivoted in a direction for opening the door.

2. The cassette tape player of claim 1, wherein protrusions are provided at opposite ends of the door, thereby providing guides for positioning the tape cassette during insertion thereof.

3. The cassette player of claim 1, wherein a curved surface is provided on the pivoting portion of the lever and wherein the abutting member abuts the curved surface, so that the abutting member moves along the curved surface to open the door.

4. The cassette tape player of claim 1, wherein said arm portion and said pivoting portion of said lever are an integral body.

* * * * *